United States Patent Office 3,698,864
Patented Oct. 17, 1972

3,698,864
SYNTHESIS OF TETRAFLUOROHYDRAZINE
Vytautas Grakauskas, Arcadia, Calif., assignor to Aerojet-General Corporation, El Monte, Calif.
Filed May 28, 1969, Ser. No. 828,743
Int. Cl. C01b 21/52
U.S. Cl. 23—205
4 Claims

ABSTRACT OF THE DISCLOSURE

This patent describes a novel process for the in situ preparation of tetrafluorohydrazine which comprises passing fluorine into an aqueous solution of an alkyl carbamate of the formula:

wherein R equals alkyl, and an oxidizing agent, and collecting the tetrafluorohydrazine reaction product.

BACKGROUND OF THE INVENTION

The present invention is directed to an improvement in the production of tetrafluorohydrazine from N,N-difluorocarbamates which is described in recently granted U.S. Pat. No. 3,350,172. According to the above-mentioned patent, the preparation of tetrafluorohydrazine is accomplished in a two-step process, the first step of which involves the fluorination of an alkyl carbamate in a nonaqueous media resulting in the synthesis of the corresponding, N,N-difluorocarbamate. In the second step, the N,N-difluorocarbamate is subjected to hydrolysis and oxidation to form tetrafluorohydrazine. The present invention represents a substantial advance in the art in that all of the chemical reactions are carried out simultaneously and in a single reaction vessel. Quite surprisingly, the desired tetrafluorohydrazine is obtained in good overall yield without any apparent significant interference from potentially competing reactions.

SUMMARY OF THE INVENTION

Briefly, the present invention comprises a novel process for the in situ preparation of tetrafluorohydrazine which comprises passing fluorine into an aqueous solution of an alkyl carbamate of the formula:

wherein R equals alkyl, and an oxidizing agent, and collecting the tetrafluorohydrazine reaction product. Preferably R is methyl, ethyl, propyl, isopropyl, tertiary butyl, decyl and the like, and contains from 1 to about 12 carbon atoms.

The process of the present invention possesses several major advantages over the two-step process of the prior art. Thus, the fluorination according to the present invention is accomplished in aqueous solution despite the fact that N,N-difluorocarbamates are relatively unstable towards hydrolysis. Aqueous fluorination of carbamates results in the process being safer and more economical. Another advantage of this process over the prior process is the elimination of one step, that is, for the first time the present invention provides the production of tetrafluorohydrazine in a single reaction which reduces handling and equipment costs.

It is an object of the present invention to provide a novel process for the preparation of tetrafluorohydrazine.

More specifically it is an object of the present invention to provide tetrafluorohydrazine in a single step from an alkyl carbamate.

These and other objects and advantages of this invention will be apparent from the more detailed description which follows.

DESCRIPTION OF PREFERRED EMBODIMENTS

While not bound by any theory, it is believed that the reaction of the present invention precedes via the hydrolytically unstable alkyl, N,N-difluorocarbamate intermediate which in turn undergoes hydrolysis and oxidation to tetrafluorohydrazine as postulated in the following reaction equations:

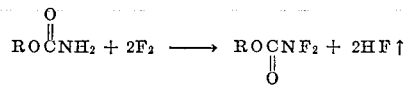

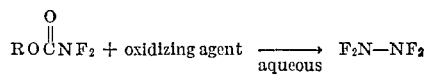

wherein R is alkyl.

The oxidant required for my reaction will fall into several different categories of compounds. The first category comprises compounds having the formula $P_yX_z$ in which P represents a simple or complex cation which includes a metal in an oxidation state ranging from $+3$ to $+8$, X represents a simple or complex anion, "y" and "z" are small whole numbers with the product of "y" times the positive oxidation state of P being equal to the product of "z" times the negative oxidation state of X. Illustrative examples of oxidant metals within this definition are $Fe^{+3}$, $Cr^{+6}$, $Mn^{+7}$, $V^{+5}$, $As^{+5}$, $Sb^{+5}$, $W^{+6}$, $Mo^{+6}$, $Os^{+8}$, $Co^{+3}$, $Pt^{+4}$, $Ru^{+8}$, $Ir^{+6}$, and $Re^{+7}$.

Examples of such oxidant compounds are vanadium pentachloride, ferric chloride, manganic bromide, chromic oxide, arsenic nitrate, cobaltic acetate, chromic formate, iridium bromide, ruthenium chloride, antimonic bromide, ferric oxide, ferric ammonium sulfate, and the like.

The term P, above, includes complex cations as, for example, in ferric ammonium sulfate which contains the ferric ion and the ammonium cation to balance the negative charge of the two sulfate anions. In this instance, the cation P can be viewed as $Fe^{+3} (NH^4)^+$ having a plus charge of four. Likewise, the term X can include a complex anion, as in the case of the compound ferric hydroxy dichloride where the anion X can be viewed as hydroxy dichloride having a minus charge of three with the hydroxy radical having a minus charge of one and each chloride ion having a minus charge of one.

A further category of oxidants which may be employed in my process are complex anions which contain 3 or 4 atoms of oxygen in combination with an element in highly charged form. Examples of such anions are permanganate, iodate, bromate, perchlorate, chromate, molybdate, vanadate, arsenate, dichromate, and the like. In this instance the complex anion is generally associated with a simple cation such as, for example, an alkali metal cation such as sodium, potassium, lithium, and the like.

The preferred oxidizing agents applicable to the present invention are the ferric salts, chromium salts having a valence of 6, hydrogen peroxide, Caro's acid, and chromium trioxide.

In general, the preferred stoichiometry of the process of the present invention involves the reaction of two moles of fluorine per mole of alkyl carbamate and one equivalent of an oxidizing agent per mole of the carbamate. The stoichiometry of the oxidizer can be illustrated for example, with an oxidizing agent containing hexavalent chromium which is reduced to trivalent chromium in this process and in which case only one-third of a mole of chromium trioxide per mole of a carbamate is required in the reaction. The optimum reaction temperature in the process of the present invention is from about −5° C. to +5° C. but higher reaction temperatures on the order of from +5° C. to +30° C. can also be employed.

The following examples are presented solely to illustrate the invention and should not be regarded as limiting in any way. In the examples, the parts and percentages are by weight unless otherwise indicated.

Example 1

Elementary fluorine diluted with nitrogen (1:2) was passed slowly with stirring and cooling into a solution of 4.45 g. (0.05 mole) of ethyl carbamate and 1.8 g. of chromium trioxide (0.018 mole) in 220 ml. of distilled water at 0 to 5° C. An evacuated infrared gas cell was attached to the gas exit line of the fluorination reactor and a gas sample was taken during the reaction. Infrared analysis of the gaseous products showed that it contained a mixture of tetrafluorohydrazine and carbon dioxide. The carbon dioxide can be removed by any conventional carbon dioxide absorber.

Example 2

Aqueous methyl carbamate, 3.8 g. (0.05 mole) was fluorinated in the manner described in Example 1 and tetrafluorohydrazine-carbon dioxide mixture was condensed in a −120° trap connected in series with the fluorination apparatus. At the end of the run the trap was warmed and the product mixture was passed into a 20% aqueous potassium hydroxide solution in order to remove carbon dioxide. Tetrafluorohydrazine escaping from the alkaline solution was passed through a drying tower and condensed at −110°. Weight 1.6 g. (64% yield).

Example 3

A solution of 10.3 g. (0.1 mole) of isopropyl carbamate and 14.9 g. (0.05 mole) of sodium dichromate dihydrate in 300 ml. of water was fluorinated with 0.2 mole of fluorine at 0–3° C. The reaction product mixture was treated in the same manner as described in Example 2 to give 3.5 g. of tetrafluorohydrazine, 70% yield.

Example 4

A solution of 8.9 g. (0.1 mole) of ethyl carbamate and 7.6 g. (0.05 mole) of ammonium chromate in 250 ml. of water was fluorinated at 0–5° with 0.2 mole of fluorine. The reaction product was condensed and purified as described in Example 2 to give 3 g. of tetrafluorohydrazine, 60% yield.

Having fully described the invention it is intended that it be limited only by the lawful scope of the appended claims.

I claim:

1. A novel process for the in situ preparation of tetrafluorohydrazine which comprises passing fluorine into an aqueous solution of an alkyl carbamate of the formula:

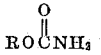

wherein R is alkyl having from 1 to about 12 carbon atoms, and an oxidizing agent selected from the group consisting of (1) compounds having the formula $P_yX_z$ in which P is a cation which includes a metal in an oxidation state ranging between +3 to +8 and selected from the group consisting of $Fe^{+3}$, $Cr^{+6}$, $Mn^{+7}$, $V^{+5}$, $As^{+5}$, $Sb^{+5}$, $W^{+6}$, $Mo^{+6}$, $Os^{+8}$, $Co^{+3}$, $Pt^{+4}$, $Ru^{+8}$, $Ir^{+6}$ and $Re^{+7}$, X is an anion, and y and z are small whole numbers with the product of y times the positive oxidation state of P being equal to the product of z times the negative oxidation state of X, (2) compounds in which an alkali metal cation is associated with a complex anion which contains from 3 to 4 atoms of oxygen in combination with an element in highly charged form, said anion being selected from the group consisting of permanganate, iodate, bromate, perchlorate, chromate, molybdate, vanadate, arsenate and dichromate, (3) hydrogen peroxide, and (4) Caro's acid, and recovering the tetrafluorohydrazine reaction product.

2. The process of claim 1 wherein the reaction is carried out at a temperature of about 0 to +5° C.

3. The process of claim 1 wherein the oxidizing agent is chromium trioxide.

4. The process of claim 1 wherein the carbamate is ethyl carbamate.

References Cited

UNITED STATES PATENTS 3,350,172 10/1967 Grakauskas _____ 23—205
3,433,595 3/1969 Lawton et al. _____ 23—205

OSCAR R. VERTIZ, Primary Examiner
G. ALVARO, Assistant Examiner

U.S. Cl. X.R.
149—36